(12) United States Patent
Benwadih et al.

(10) Patent No.: US 10,899,895 B2
(45) Date of Patent: Jan. 26, 2021

(54) METHODS FOR MANUFACTURING COATED METAL NANOPARTICLES AND A COMPOSITE MATERIAL COMPRISING SAME, USE OF SUCH A MATERIAL AND DEVICE COMPRISING SAME

(71) Applicant: Commissariat à l'énergie atomique et aux énergies alternatives, Paris (FR)

(72) Inventors: Mohammed Benwadih, Champigny sur Marne (FR); Jacqueline Bablet, Le Gua (FR); Olivier Poncelet, Grenoble (FR); Jonathan Skrzypski, Gurgy (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 407 days.

(21) Appl. No.: 15/831,583

(22) Filed: Dec. 5, 2017

(65) Prior Publication Data

US 2018/0155508 A1 Jun. 7, 2018

(30) Foreign Application Priority Data

Dec. 6, 2016 (FR) ..................... 16 61979

(51) Int. Cl.
| | | |
|---|---|---|
| *C08J 3/20* | (2006.01) | |
| *C08L 25/06* | (2006.01) | |
| *H01Q 1/36* | (2006.01) | |
| *H01F 1/00* | (2006.01) | |
| *B22F 1/02* | (2006.01) | |
| *B22F 1/00* | (2006.01) | |
| *B22F 9/24* | (2006.01) | |

(52) U.S. Cl.
CPC ............. *C08J 3/203* (2013.01); *B22F 1/0018* (2013.01); *B22F 1/02* (2013.01); *B22F 9/24* (2013.01); *C08L 25/06* (2013.01); *H01F 1/0054* (2013.01); *H01Q 1/36* (2013.01); *C08J 2325/06* (2013.01); *C08L 2203/206* (2013.01); *C08L 2207/53* (2013.01)

(58) Field of Classification Search
CPC . C08L 2203/206; C08L 2207/53; C08J 3/203; H01F 1/0054; H01Q 1/36; B22F 1/0018; B22F 1/0062; B22F 1/02; B22F 9/24
See application file for complete search history.

(56) References Cited

U.S. PATENT DOCUMENTS

| | | |
|---|---|---|
| 8,236,284 B1 | 8/2012 | Perez et al. |
| 2013/0063296 A1* | 3/2013 | Hennig ............... H01Q 1/245 342/1 |

FOREIGN PATENT DOCUMENTS

WO 2007106771 A2 9/2007

OTHER PUBLICATIONS

French Search Report for FR 16 61979 dated Nov. 15, 2017.

* cited by examiner

*Primary Examiner* — C Melissa Koslow
(74) *Attorney, Agent, or Firm* — Pearne & Gordon LLP

(57) ABSTRACT

A method for preparing coated metal nanoparticles, each nanoparticle comprising a core constituted of at least one metal M and a layer constituted of at least one polymer, the layer coating the metal core. The method comprises the steps: ($a_1$) preparing a solution A comprising the at least one metal M in the form of cations $M^{n+}$, n being an integer comprised between 1 and 3, each metal M being a transition metal of atomic number comprised between 21 and 30, a polyol, and a noble metal salt; ($a_2$) preparing a solution B comprising at least one organic monomer of the at least one polymer, in an organic solvent; (b) mixing solutions A and B, this mixture being heated to the boiling temperature of the polyol; and (c) recovering the coated metal nanoparticles.

19 Claims, 1 Drawing Sheet

METHODS FOR MANUFACTURING COATED METAL NANOPARTICLES AND A COMPOSITE MATERIAL COMPRISING SAME, USE OF SUCH A MATERIAL AND DEVICE COMPRISING SAME

This application claims priority from French Patent Application No. 16 61979 filed on Dec. 6, 2016. The content of this application is incorporated herein by reference in its entirety.

TECHNICAL FIELD

The invention relates to a method for preparing coated metal nanoparticles, said nanoparticles having magnetic and dielectric properties.

The invention also relates to a method for manufacturing a composite material obtained from a formulation comprising said coated metal nanoparticles dispersed in a polymeric matrix.

The invention also relates to uses of the composite material as obtained by said manufacturing method as well as to an electronic or radiofrequency device comprising said composite material.

PRIOR ART

Faced with miniaturisation and the desire to integrate an ever increasing number of new applications within a same wireless communication system, such as a mobile terminal, the reduction in the size of its constituent elements, notably that of the antenna, becomes an important challenge.

The dimensions of such an antenna being inversely proportional to the product of the relative dielectric permittivity, noted $\varepsilon_r$, and the relative magnetic permeability, noted $\mu_r$, the reduction in the size of the antenna generally involves the use of purely dielectric materials with high permittivity.

However, the use of such dielectric materials is to the detriment of some of the performances of the antenna, among which the passband thereof.

To overcome the drop in performances of the passband, it has been proposed to use materials combining magnetic permeability with dielectric permittivity and, in particular, materials referred to as "composite materials", "magnetic and dielectric materials" or "magneto-dielectric materials". It is the expression "composite material(s)" that will be used in the remainder of the present description.

These composite materials are conventionally obtained from a formulation comprising a polymeric matrix and particles dispersed in the polymeric matrix.

Conventionally, the particles dispersed in the polymeric matrix are inorganic nanoparticles, the term "nanoparticles" defining particles of which the three dimensions are comprised between 1 nm and 1000 nm.

The properties of the composite material may thereby be adjusted on a customised basis, notably as a function of the nature of said nanoparticles dispersed in the polymeric matrix.

Reference may notably be made to the document WO 2007/106771 A2, referenced [1] in the remainder of the present description, which provides a review of the numerous paths explored both for the manufacture of such composite materials and for the preparation of specific nanoparticles.

In particular, the use of nanoparticles of a transition metal of the 3d series, and/or metal alloys thereof, confers good magnetic permeability but low dielectric permittivity on said composite material.

Indeed, due to their magnetic properties, these metal nanoparticles have a tendency to agglomerate together. Since such agglomerates of nanoparticles are particularly difficult to disperse in a solvent or in a polymeric matrix, it becomes practically impossible to form layers of composite material having a homogeneous distribution of said nanoparticles. What is more, the presence of said agglomerates may favour the circulation of an electric current between the nanoparticles present in the composite material and, thereby, cause short-circuits within a same layer of composite material, or even between different layers of a same multilayer structure.

What is more, experience shows that films of a composite material obtained from a formulation comprising such agglomerates of metal nanoparticles in a polymeric matrix are characterised by lack of cohesion and of mechanical strength.

The aim of the invention is, consequently, to overcome the drawbacks of composite materials of the prior art and to propose a method for preparing nanoparticles which, once dispersed in a polymeric matrix, form with this matrix a formulation making it possible to obtain a composite material which has a magnetic permeability comparable to that of composite materials of the prior art, typically of at least 1, as well as mechanical properties and a dielectric permittivity that are both superior to those of said composite materials of the prior art, the dielectric permittivity being at least 2, said dielectric permittivity being advantageously at least 3 and, preferentially, at least 4.

Another aim of the invention is thus to propose a method for manufacturing such a composite material, said composite material notably having to make it possible to produce antennas that have a size that is as small as possible without their properties, and notably their passband, being altered.

DESCRIPTION OF THE INVENTION

These aims and yet others are attained, firstly, by a method for preparing coated metal nanoparticles, each nanoparticle comprising a core constituted of at least one metal M and a layer constituted of at least one polymer, the layer coating the metal core.

According to the invention, the method comprises the following steps:

(a$_1$) the preparation of a solution A comprising:
  said at least one metal M in the form of cations $M^{n+}$, n being an integer comprised between 1 and 3, each metal M being a transition metal of atomic number comprised between 21 and 30,
  a polyol, and
  a noble metal salt, (a$_2$) the preparation of a solution B comprising at least one organic monomer of said at least one polymer, in an organic solvent, (b) the mixing of the solutions A and B, this mixture being heated to the boiling temperature of the polyol, whereby coated metal nanoparticles are obtained, and (c) the recovery of the coated metal nanoparticles.

In the foregoing and hereafter, "nanoparticles" is taken to mean particles of which the three dimensions are comprised between 1 nm and 1000 nm.

In the same way, the expression "comprised between . . . and . . . ", which has been used to define an interval and which is used in the remainder of the present application, should be understood as defining not only the values of the interval, but also the values of the limits of said interval.

The coated metal nanoparticles such as prepared by the method according to the invention have concurrently magnetic properties, conferred by the metal or the metal alloy forming the core of said nanoparticles, and dielectric properties, conferred by the polymer or the polymeric alloy forming the layer of said nanoparticles, it being specified that said polymeric layer coats the metal core in such a way as to be in contact with said core and to coat it.

Thus, as will be seen hereafter, the composite material, which is prepared from a formulation comprising said coated metal nanoparticles dispersed in a polymeric matrix, has concurrently a magnetic permeability and a dielectric permittivity, as well as good mechanical properties.

The method for preparing coated metal nanoparticles according to the invention comprises a step ($a_1$) during which the preparation of a solution A comprising at least one metal M in the form of cations $M^{n+}$, a polyol and a noble metal salt is carried out.

This solution A may only comprise a single metal M in cationic form, but it may also comprise several metals M in cationic form, that is to say comprise a mixture of two, three, or even more, separate metals $M_1$, $M_2$, $M_3$ . . . , said metals all being in cationic form.

The solution A prepared during step ($a_1$) comprises said at least one metal M in the form of cations $M^{n+}$, with n being an integer comprised between 1 and 3.

Although it is more particularly envisaged that the solution A comprises one or more metals M in a single of the cationic forms thereof, nothing prevents envisaging that this solution A comprises this or these metals M in several of the cationic forms thereof.

In an advantageous alternative of the invention, the solution A comprises said at least metal M in the form of cations $M^{2+}$, corresponding to the case where n=2.

Whether the solution A comprises a single metal M or several metals M, whether this or these metals M are in a single cationic form or in several of the cationic forms thereof, each metal M is a transition metal having an atomic number comprised between 21 and 30, thereby corresponding to a transition metal of the 3d series.

In a preferential alternative of the invention, each transition metal M is selected from the group constituted of Ni, Fe and Co.

The metal core of each nanoparticle may thus be notably constituted of a single of said metals, which may then be Ni, Fe or Co, by an alloy of two of said metals, said alloy then being able to be an alloy of Ni—Fe, Co—Ni or Fe—Co, or by an alloy of said three metals, that is to say a Ni—Fe—Co alloy.

In a more preferential alternative, the metal core of each nanoparticle is constituted of a Co—Ni alloy.

If it may obviously be envisaged to prepare nanoparticles of which the metal core may comprise any Co/Ni molar ratio, a Co/Ni molar ratio comprised between 50/50 and 90/10 is however favoured to obtain nanoparticles of which the morphology is close to that of rods.

Said Co/Ni molar ratio is advantageously comprised between 70/30 and 85/15 and is, preferentially, of the order of 80/20.

In one embodiment of the invention, said at least one metal M in the form of cations $M^{n+}$ is a metal salt.

In an advantageous alternative of the invention, said metal salt comprises at least one element selected from the group constituted of an acetate, an acetyl acetonate, a hydroxide and an oxide of the transition metal M.

In a preferential alternative of the invention, said metal salt is an acetate of the transition metal M, such an acetate being able to be anhydrous or hydrated.

As examples of acetates of the transition metal M, a nickel acetate $Ni(CH_3COO)_2$, an iron acetate $Fe(CH_3COO)_2$ or a cobalt acetate $Co(CH_3COO)_2$ may notably be cited.

As examples of acetyl acetonates of the transition metal M, a nickel acetyl acetonate, an iron acetyl acetonate or a cobalt acetyl acetonate may notably be cited.

In one embodiment of the invention, the molar concentration of cations $M^{n+}$, noted $[M^{n+}]$, in the solution A, is comprised between 0.02 mol/L and 1 mol/L.

In an advantageous alternative of the invention, said molar concentration $[M^{n+}]$ is comprised between 0.04 mol/L and 0.5 mol/L and, preferentially, between 0.06 mol/L and 0.1 mol/L.

In addition to the metal(s) M in the form of cations $M^{n+}$, the solution A implemented during step ($a_1$) comprises a solvent, in the present case a polyol, and a nucleating agent, in the present case a noble metal salt.

In the foregoing, "noble metal" is taken to mean one of the following eight metals: gold, silver, rhodium, osmium, palladium, ruthenium, iridium and platinum.

In one embodiment of the invention, the noble metal is selected from osmium, ruthenium and iridium.

Polyols are protic polar solvents which make it possible to dissolve at least partially metal salts and, in particular, the acetates of the transition metal M described above.

In one embodiment of the invention, the polyol is a diol, advantageously an α-diol.

As non-limiting examples of α-diols, ethane-1,2-diol, also known as ethylene glycol, propane-1,2-diol or butane-1,2-diol may notably be cited.

The noble metal salt of which the role is specified below may notably be selected from osmium chloride, ruthenium chloride and iridium chloride.

In one embodiment of the invention, the ratio between the molar concentration of noble metal and the molar concentration of cations $M^{n+}$, noted [noble metal]/$[M^{n+}]$, is comprised between 0.005 and 0.1.

In one advantageous embodiment of the invention, said ratio of molar concentrations [noble metal]/$[M^{n+}]$ is comprised between 0.01 and 0.05 and, preferentially, between 0.02 and 0.03.

In one embodiment of the invention, the solution A may further comprise sodium hydroxide, in a molar concentration [NaOH] of at most 0.5 mol/L.

In an advantageous alternative of the invention, said molar concentration [NaOH] is comprised between 0.05 mol/L and 0.4 mol/L and, preferentially, between 0.1 mol/L and 0.3 mol/L.

In one embodiment of the invention, step ($a_1$) of preparation of the solution A is conducted at a temperature that is strictly below the boiling temperature of the polyol present in said solution A.

In an advantageous alternative, the temperature at which the solution A is prepared is comprised between 0° C. and 30° C. and, preferentially, between 15° C. and 25° C., said latter interval corresponding to room temperature.

The method for preparing coated metal nanoparticles according to the invention also comprises a step ($a_2$) during which the preparation of a solution B comprising at least one organic monomer of said at least one polymer in an organic solvent is carried out.

The solution B may only comprise a single organic monomer, in which case, after polymerisation, a homopolymer is obtained. But nothing prevents envisaging that the solution B comprises two, three, or even more, monomers, in which case, after polymerisation, a copolymer is obtained.

In one embodiment of the invention, this or these organic monomers may notably be selected from the group constituted of styrene, an alkyl (meth)acrylate, a fluorocarbon monomer, norbornene and ethylene.

The expression "alkyl (meth)acrylate" refers both to an alkyl acrylate and to an alkyl methacrylate.

The alkyl (meth)acrylate monomer may notably be selected from methyl (meth)acrylate, ethyl (meth)acrylate, n-butyl (meth)acrylate, isobutyl (meth)acrylate, octyl (meth)acrylate and 2-ethylhexyl (meth)acrylate. Said alkyl (meth)acrylate monomer is advantageously methyl methacrylate, noted MMA.

In an advantageous alternative of the invention, the solution B only comprises a single monomer, said monomer being able notably to be methyl methacrylate MMA, styrene, norbornene or ethylene which, after polymerisation, lead respectively to poly(methyl methacrylate) or PMMA, to polystyrene, to polynorbornene or to polyethylene.

The solution B also comprises an organic solvent in which the organic monomer(s) are in solution.

As examples, tetrahydrofuran (THF) or chloroform could be chosen to solubilise the styrene.

In one embodiment of the invention, step ($a_2$) of preparation of the solution B is conducted at room temperature, that is to say at a temperature typically comprised between 15° C. and 25° C.

Steps ($a_1$) and ($a_2$) of preparation of the solutions A and B may be carried out one after the other or concurrently.

The method for preparing coated metal nanoparticles according to the invention also comprises a step (b) during which the mixing of the solutions A and B prepared during steps ($a_1$) and ($a_2$) is carried out.

This step (b) of mixing the solutions A and B is conducted at a temperature corresponding to the boiling temperature of the polyol present in the solution A.

During this step (b) of mixing the solutions A and B, the following take place concurrently:
- the total dissolution of the compound comprising the metal(s) M in the form of cations $M^{n+}$,
- the reduction of the cations $M^{n+}$ into said at least one metal M to its degree of oxidation 0, noted $M^0$, according to the following reaction:

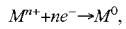
$$M^{n+} + ne^- \rightarrow M^0,$$

and, in doing so, the formation of the metal core of each of the nanoparticles,
- the growth of said metal core,
- the formation of the polymeric layer around said metal core by polymerisation of the monomer(s) present in the mixture and, in doing so, obtaining coated metal nanoparticles.

The coated metal nanoparticles as obtained at the end of step (b) of mixing are in the form of solid nanoparticles in the solution.

The use of an α-diol as polyol has several advantages due to the polar and reducing character of said α-diols and to their high boiling point. It is thereby possible to solubilise a large number of metal salts comprising the metal(s) M in cationic form and to reduce the corresponding cations at a temperature which is adjustable in a quite wide temperature interval.

The reduction of the cations $M^{n+}$ into metal or metals $M^0$ thus takes place directly in solution.

The noble metal, which is also in cationic form in the noble metal salt present in the solution A, is also reduced during step (b) of mixing and thereby forms seeds which can serve as growth sites, or nucleation sites, for the metal core. The control of the size of the nanoparticles is ensured by the molar ratio [noble metal]/[$M^{n+}$].

To favour this reduction reaction in such a way as to make it as quantitative as possible, it is possible to introduce, into the solution A, sodium hydroxide.

The layer of polymer(s) that forms around the nanoparticles is obtained by polymerisation in solution of the organic monomer(s) initially present in the solution B, said polymerisation being catalysed by the noble metal salt initially present in the solution A.

It should be noted that the morphology of the coated metal nanoparticles as obtained at the end of step (b) of mixing may be modulated as a function of the compounds presents in the solution A and their molar concentration.

In one particularly favoured embodiment of the invention, which makes it possible to obtain nanoparticles comprising a metal core constituted of an alloy of Co—Ni and having a rod morphology, the solution A comprises a cobalt acetate, a nickel acetate, butane-1,2-diol, sodium hydroxide, and ruthenium trichloride, in the following conditions:
- a Co/Ni molar ratio comprised between 50/50 and 90/10,
- a [Co+Ni] molar concentration comprised between 0.02 mol/L and 1 mol/L,
- a [Ru]/[Co+Ni] molar ratio comprised between 0.005 and 0.1, and
- a NaOH molar concentration [NaOH] comprised between 0.05 mol/L and 0.5 mol/L.

The method for preparing coated metal nanoparticles according to the invention comprises, after step (b) of mixing the solutions A and B, a step (c) during which the coated metal nanoparticles are recovered, said coated metal nanoparticles then being able to be used subsequently.

This step (c) of recovery may be carried out by any technique normally used for the separation of a solid and a liquid, such as filtration, centrifugation, etc.

The invention relates, secondly, to a method for manufacturing a composite material.

According to the invention, said manufacturing method comprises the following steps (1) to (4):
(1) a preparation of coated metal nanoparticles, each nanoparticle comprising a core constituted of at least one metal M and a layer constituted of at least one polymer, the layer coating the metal core, by the implementation of the preparation method as defined above,
(2) a mixing of the nanoparticles prepared at step (1) in a polymeric matrix, whereby a formulation comprising the nanoparticles dispersed in the polymeric matrix is obtained,
(3) a deposition of the formulation obtained at the end of step (3), and
(4) an application of energy to the formulation deposited at step (3), whereby the composite material is obtained.

The characteristics described previously in relation with the method for preparing coated metal nanoparticles, notably the composition of the solutions A and B as well as the characteristics relative to the coated metal nanoparticles and to the polymers capable of being used in the polymeric matrix, are obviously applicable to the present manufacturing method.

The manufacturing method according to the invention is thus particularly easy to implement, the nanoparticles prepared during step (1) being able to be directly incorporated and dispersed in the polymeric matrix.

Step (2) consists in obtaining, by mixing and/or blending, a formulation characterised by a distribution of the coated metal nanoparticles in the polymeric matrix that is the most homogeneous possible.

According to a particular embodiment of the invention, the proportion by weight of coated metal nanoparticles, compared to the total weight of the formulation, is comprised between 10% and 50%, advantageously between 15% and 45% and, preferentially, between 20% and 40%.

Numerous polymers may be envisaged for the polymeric matrix of the formulation from which the composite material according to the invention is obtained.

Said polymeric matrix may notably comprise at least one polymer selected from the group constituted of a thermosetting polymer, a thermoplastic polymer and an elastomer, said polymer being able to be alone or in a mixture in the form of an alloy.

In an advantageous alternative, the polymeric matrix comprises at least one thermoplastic polymer, which may notably be selected from the group constituted of a polystyrene, a poly(methyl methacrylate), a fluorocarbon polymer, a polynorbornene and a polyethylene, said polymer preferentially being a polystyrene.

In a preferential alternative, the polymer forming the layer of each nanoparticle and the polymer of the polymeric matrix are identical, so as to favour the properties of the composite material, in particular the cohesion and mechanical strength thereof.

Step (3) of deposition of the formulation may be carried out by any known technique and, among others, by spin coating, screen printing, photogravure, spraying, etc.

Step (4) of application of energy is conventionally carried out by a heat treatment of the formulation deposited during step (3), optionally combined with ionising radiation, in order to enable the polymerisation of the polymer(s) forming the matrix of the formulation.

The invention relates, thirdly, to uses of the composite material as defined above, the advantageous characteristics of said composite material being able to be taken alone or in combination.

The composite material according to the invention may notably be used to form a magnetic and dielectric film or layer, said film or said layer being notably intended for an electronic device or a radiofrequency device, such as an antenna.

Said radiofrequency device may notably be suitable for high frequency, "high frequency" being defined by a frequency comprised between 10 MHz and 3 GHz.

The invention relates, fourthly, to an electronic device or to a radiofrequency device.

According to the invention, said device, whether it is electronic or radiofrequency, comprises, as dielectric material, a composite material as defined above, the advantageous characteristics of said composite material being able to be taken alone or in combination.

The radiofrequency device may notably be an antenna, in particular an antenna intended for a communicating object, such as a mobile telephone.

It is observed, in fact, that the presence of a composite material in such an antenna makes it possible to overcome the passband reduction that is observed with the composite materials used to date.

Other characteristics and advantages of the invention will become clearer from the complement to the description that follows and which relates to two examples of preparation of Co—Ni nanoparticles, of which one according to the invention.

It is pointed out that this complement to the description, which refers notably to FIGS. 1 and 2 as appended, is only given for the purpose of illustrating the object of the invention and does not constitute in any case a limitation of said object.

DETAILED DESCRIPTION OF PARTICULAR EMBODIMENTS

1. Preparation of Non-Coated Co—Ni Nanoparticles

The Co—Ni nanoparticles were prepared from cobalt acetate tetrahydrate, $Co(CH_3COO)_2$, 4 $H_2O$, and nickel acetate tetrahydrate $Ni(CH_3COO)_2$, 4 $H_2O$.

1.59 g of cobalt acetate tetrahydrate and 0.398 g of nickel acetate tetrahydrate were dissolved in 100 mL of butane-1,4-diol, in a Co/Ni molar ratio of 80/20. To the mixture thereby obtained are next successively added 600 mg of sodium hydroxide NaOH pellets, so as to reach a molar concentration of NaOH, in the solution, of 0.15 mol/L, and 52 mg of ruthenium trichloride $RuCl_3$. The resulting solution has the following characteristics:

a molar concentration of cobalt-nickel [Co+Ni]=0.08 mol/L, a [Ru]/[Co+Ni] molar ratio=2.5%, and a molar concentration of NaOH [NaOH]=0.15 mol/L.

The reaction mixture thereby obtained is then heated to 170° C., under mechanical stirring, for 30 min, after which time a black coloured solution is obtained.

The Co—Ni nanoparticles are next collected and washed, three times, with ethanol by centrifugation for 5 min and at 8000 rpm, before being dried in an oven.

Figure 1:
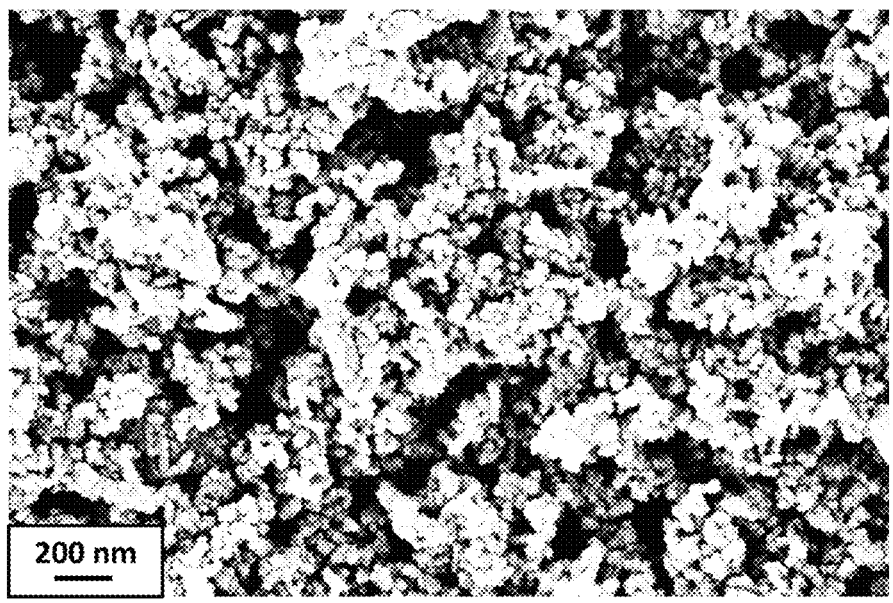
FIG. 1 corresponds to an image taken using a scanning electron microscope (SEM) of non-coated Co—Ni nanoparticles.

With reference to FIG. 1, which corresponds to the SEM image of the nanoparticles thereby prepared, it is observed that the nanoparticles obtained by the implementation of the preparation method described above are in the form of nanoparticles which are agglomerated with each other. These agglomerates have a size comprised between 30 nm and 60 nm, it being noted that, by complementary analysis, it has been determined that the nanoparticles themselves have a size of 2 nm to 3 nm.

It is thus easily understood that a composite material that would be obtained from a formulation comprising the nanoparticles prepared in accordance with the protocol that has just been described cannot have a homogeneous distribution of the nanoparticles within the polymeric matrix. This has the consequence that an electric current is capable of being established, at least within said composite material, or even with other materials with which it could come into contact, making it lose its dielectric properties to said composite material.

2. Preparation of Co—Ni Nanoparticles Coated According to the Method of the Invention The Co—Ni nanoparticles were prepared from cobalt acetate tetrahydrate, $Co(CH_3COO)_2$, 4$H_2O$, and nickel acetate tetrahydrate $Ni(CH_3COO)_2$, 4$H_2O$.

As in the preceding example 1, 1.59 g of cobalt acetate tetrahydrate and 0.398 g of nickel acetate tetrahydrate were dissolved in 100 mL of butane-1,2-diol, in a Co/Ni molar ratio of 80/20. To the mixture thereby obtained are next successively added 600 mg of sodium hydroxide pellets, so as to reach a molar concentration of NaOH, in the solution, of 0.15 mol/L, and 52 mg of ruthenium trichloride $RuCl_3$. The resulting solution A has the following characteristics:

a molar concentration of cobalt-nickel [Co+Ni]=0.08 mol/L, a [Ru]/[Co+Ni] molar ratio=2.5%, and a molar concentration of NaOH [NaOH]=0.15 mol/L.

Two solutions B were prepared, each comprising styrene and benzoyl peroxide (Luperox®) in tetrahydrofuran THF under argon at 25° C., the monomer/Luperox® ratio being above 100 and below 400.

To characterise the polymer that will form the polymeric layer of the Co—Ni nanoparticles, the Inventors have examined the reaction product such as obtained in situ from one of the two solutions B: it is a polystyrene having a number average molar mass Mn, such as measured by exclusion chromatography, of 35000 g/mol.

The other solution B is added to the solution A. The reaction mixture thereby obtained is then heated to 170° C., under mechanical stirring, for 30 min, at the end of which a black coloured solution is obtained.

The coated metal nanoparticles thereby obtained are next collected and washed, three times, with ethanol by centrifugation for 5 min and at 8000 rpm, before being dried in an oven.

Figure 2:
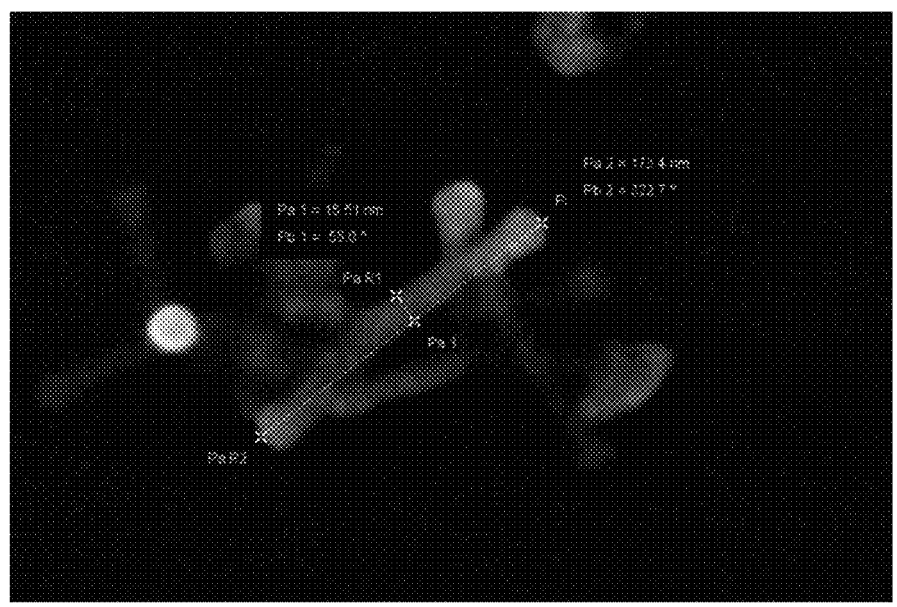
FIG. 2 corresponds to an image taken using a scanning electron microscope (SEM) of Co—Ni nanoparticles coated with a layer of polystyrene, such as obtained by the implementation of the method according to the invention.

With reference to FIG. 2, it may be observed that the SEM image shows that the coated metal nanoparticles such as obtained by the implementation of the preparation method according to the invention are in the form of individualised rods, of an average length of 200 nm.

This length of the coated metal nanoparticles is directly linked to the reaction time of the reaction mixture. Indeed, if a reaction time of 30 min makes it possible to obtain an average length of 200 nm, experience shows that a reaction time of 10 h enables average lengths of coated metal nanoparticles of 10 μm to be reached.

It is thus possible, without any difficulty, to adapt the reaction time to the average length of the coated metal nanoparticles that it is sought to obtain.

The coated metal nanoparticles such as obtained by the method according to the invention may then be introduced into a polymeric matrix. The formulation thereby obtained may be deposited on a surface in the form of a layer in which the nanoparticles are spread out in a regular manner and along a same direction. The polymeric coating of the nanoparticles makes it possible to ensure that no short circuit forms in the composite material obtained after heat treatment, even in the hypothesis where some of the nanoparticles could come into contact with each other. The composite material thus has concurrently magnetic and dielectric properties.

BIBLIOGRAPHY

[1] WO 2007/106771 A2

The invention claimed is:

1. A method for preparing coated metal nanoparticles, each nanoparticle comprising a core constituted of at least one metal M and a layer constituted of at least one polymer, the layer coating the metal core, which method comprises the following steps:

($a_1$) preparing a solution A comprising:

said at least one metal M in the form of cations $M^{n+}$, n being an integer comprised between 1 and 3, each metal M being a transition metal of atomic number comprised between 21 and 30, a polyol, and a noble metal salt, ($a_2$) preparing a solution B comprising at least one organic monomer of said at least one polymer, in an organic solvent, (b) mixing the solutions A and B, this mixture being heated to the boiling temperature of the polyol, whereby coated metal nanoparticles are obtained, and (c) recovering the coated metal nanoparticles.

2. The method according to claim 1, wherein each transition metal M is selected from the group constituted of Ni, Fe and Co.

3. The method according to claim 2, wherein the core is constituted of Ni, Fe, Co, Ni—Fe, Co—Ni, Fe—Co or Ni—Fe—Co.

4. The method according to claim 3, wherein, the core being constituted of a Co—Ni alloy, the Co/Ni molar ratio is comprised between 50/50 and 90/10.

5. The method according to claim 1, wherein said at least one metal M in the form of cations $M^{n+}$ is a metal salt.

6. The method according to claim 5, wherein said metal salt comprises at least one element selected from the group constituted of an acetate, an acetyl acetonate, a hydroxide and an oxide of the transition metal M.

7. The method according to claim 1, wherein the molar concentration of cations $M^{n+}$ [$M^{n+}$], in the solution A, is comprised between 0.02 mol/L and 1 mol/L.

8. Method according to claim 1, wherein the polyol is a diol.

9. The method according to claim 8, wherein the diol is an α-diol.

10. The method according to claim 9, wherein the α-diol is butane-1,2-diol.

11. The method according to claim 1, wherein the noble metal salt is selected from osmium chloride, ruthenium chloride and iridium chloride.

12. The method according to claim 1, wherein the ratio of molar concentrations between the noble metal and the cations $M^{n+}$, noted [noble metal]/[$M^{n+}$], is comprised between 0.005 and 0.1.

13. The method according to claim 1, wherein the solution A further comprises sodium hydroxide, in a molar concentration [NaOH] of at most 0.5 mol/L.

14. The method according to claim 1, wherein said at least one organic monomer is selected from the group constituted of styrene, an alkyl (meth)acrylate, a fluorocarbon monomer, norbornene and ethylene.

15. The method according to claim 1, wherein n is equal to 2.

16. A method for manufacturing a composite material, which method comprises the following steps:

(1) preparing coated metal nanoparticles, each nanoparticle comprising a core constituted of at least one metal M and a layer constituted of at least one polymer, the layer coating the metal core, by the implementation of the preparation method according to claim 1, (2) mixing the nanoparticles prepared at step (1) in a polymeric matrix, whereby a formulation comprising the nanoparticles dispersed in the polymeric matrix is obtained, (3) obtaining a deposition of the formulation at the end of step (3), and (4) applying a heat treatment of the formulation deposited at step (3), whereby the composite material is obtained.

17. The method according to claim 16, wherein the polymeric matrix comprises at least one polymer selected from the group constituted of a polystyrene, a poly(methyl methacrylate), a fluorocarbon polymer, a polynorbornene and a polyethylene.

18. The method according to claim 16, wherein the polymer of the layer coating each nanoparticle and the polymer of the polymeric matrix are identical.

19. An antenna, comprising, as dielectric material, a composite material obtained by the implementation of the manufacturing method according to claim 17.

* * * * *